United States Patent [19]

Monma et al.

[11] 4,413,558
[45] Nov. 8, 1983

[54] LINE PRINTER AND TYPE CARRIER FOR USE THEREIN

[75] Inventors: Hisayoshi Monma; Masao Miyasaka; Kazuyuki Kubo, all of Ibaragi, Japan

[73] Assignee: Hitachi Koki Co., Ltd., Tokyo, Japan

[21] Appl. No.: 309,134

[22] Filed: Oct. 6, 1981

[30] Foreign Application Priority Data

Oct. 7, 1980 [JP] Japan .............................. 55-140833
Feb. 20, 1981 [JP] Japan ................................ 56-24566

[51] Int. Cl.³ .............................................. B41J 1/20
[52] U.S. Cl. ............................... 101/93.14; 101/93.29
[58] Field of Search .............. 101/93.09, 93.14, 93.29, 101/93.31, 93.48, 96; 364/900

[56] References Cited

U.S. PATENT DOCUMENTS

| | | | |
|---|---|---|---|
| 3,827,357 | 8/1974 | Mahoney | 101/93.14 |
| 3,973,487 | 8/1976 | Mahoney | 101/93.29 |
| 4,009,654 | 3/1977 | Harris et al. | 101/93.14 X |
| 4,074,068 | 2/1978 | Wada et al. | 101/93.14 X |
| 4,218,754 | 8/1980 | Schaeffer | 101/93.14 X |

OTHER PUBLICATIONS

Brunsvold, IBM Tech. Discl. Bulletin, vol. 23, No. 2, Jul. 1980, pp. 727-730.

Primary Examiner—Edward M. Coven
Attorney, Agent, or Firm—Sughrue, Mion, Zinn, Macpeak and Seas

[57] ABSTRACT

A line printer of the type using a 384-character type carrier receives a 240-character type data array from a computer designed for a 240-character line printer and converts the 240-character array into a 384-character data array with no partial character sets. The converted 384-character data array corresponds exactly to the characters on the type carrier. The type carrier includes a number of dummy characters in each character set if the type carrier employs other than 48-character sets.

11 Claims, 12 Drawing Figures

LINE PRINTER AND TYPE CARRIER FOR USE THEREIN

BACKGROUND OF THE INVENTION

The present invention relates to a line printer. More specifically, the invention relates to an impact line printer which can maintain a high printing speed irrespective of variations in the types of printing fonts used on the type carrier.

Although type carriers may commonly be print bands, print drums, print trains and print chains and the like, a conventional impact line printer will be described with reference to a print band.

In one known printer, the print band incorporates 384 characters on one circumference, and contains 8 sets of 48 characters, 6 sets of 64 characters, 4 sets of 96 characters or 3 sets of 128 characters. A second known type of conventional line printer incorporates a print band containing 240 characters on one circumference, with 8 sets of 30 characters, 5 sets of 48 characters, 4 sets of 60 characters, or 2 sets of 120 characters.

It is also generally known to store in a read only memory (ROM) within the line printer an array of data corresponding to the sequence of type characters on the print band or to write and store in a Universal Character Set Buffer (UCSB) within the line printer an array of type character data transferred from the channel of a computer system to which the line printer is connected.

When using a ROM, it is necessary to replace the memory by a new one every time the print band is changed. If a UCSB is used, however, it is not necessary to replace the memory even when the print band is changed, but it is only necessary to transfer from the computer to the UCSB a type data array corresponding to the type characters on the new print band.

The size of the data array thus transferred from the computer to the UCSB depends upon the type of line printer to be connected. For example, 240 bytes are transferred for a line printer having a print band including 240 type characters, and 384 bytes are transferred for a line printer having a print band including 384 type characters. The controlling computers in available line printers, are usually not designed for use with both 240-character and 384-character line printers, but will only transfer either 240 or 384 characters to the line printer depending on the computer software. That is, a computer designed for use with a 240-character line printer can only transfer data corresponding to a 240-character print band. The size of the transferred type character data array will always be constant unless the software for controlling the computer is modified. It is sometimes desirable in a system using a 240-character print band to replace the line printer by a new line printer employing 384 type characters on one circumference of the print band. However, in a system in which a type character data array is transferred from a computer to the UCSB within the line printer, it is impossible to merely replace the line printer by a new one due to the different number of type characters on the print bands of the two line printers, because there exists a problem that the computer software must then be modified as described above to change the size of the type character data array to be transferred.

SUMMARY OF THE INVENTION

Accordingly, it is a primary object of the present invention to provide an impact line printer which can eliminate the aforementioned disadvantages and drawbacks of the conventional line printer, i.e., a line printer which uses 384-character print bands but which is compatible with a computer system which is designed only for use with a line printer using 240-character print bands.

According to the present invention, there is provided an improved impact line printer in which a type carrier is provided which contains a predetermined number of dummy type characters in each character set which do not contribute to printing. The printer also includes two UCSBs instead of the conventional one. Thus, the type data array transferred from the computer is written and stored in one UCSB, and the type data array thus stored in the one UCSB is sequentially written and stored in the other UCSB while simultaneously converting the array into an array having the same number of characters as on the type carrier being used. Thus, the line printer using 384-character print bands will be compatible with a computer system which is designed for use with line printer using 240-character print bands.

Further in accordance with this invention, there is provided an impact line printer in which blanks or meaningless data are written at a predetermined number of addresses in the second UCSB so that the type data array thus written and stored in the second UCSB may completely correspond to the type characters on the type carrier, the data in the second UCSB being written as a plurality of blocks each of the same size and each containing all of the characters from a complete block of the first UCSB, so as to eliminate incomplete blocks and thereby maintain a high printing speed.

DETAILED DESCRIPTION OF THE PREFERRED EMBODIMENTS

Figure 1:
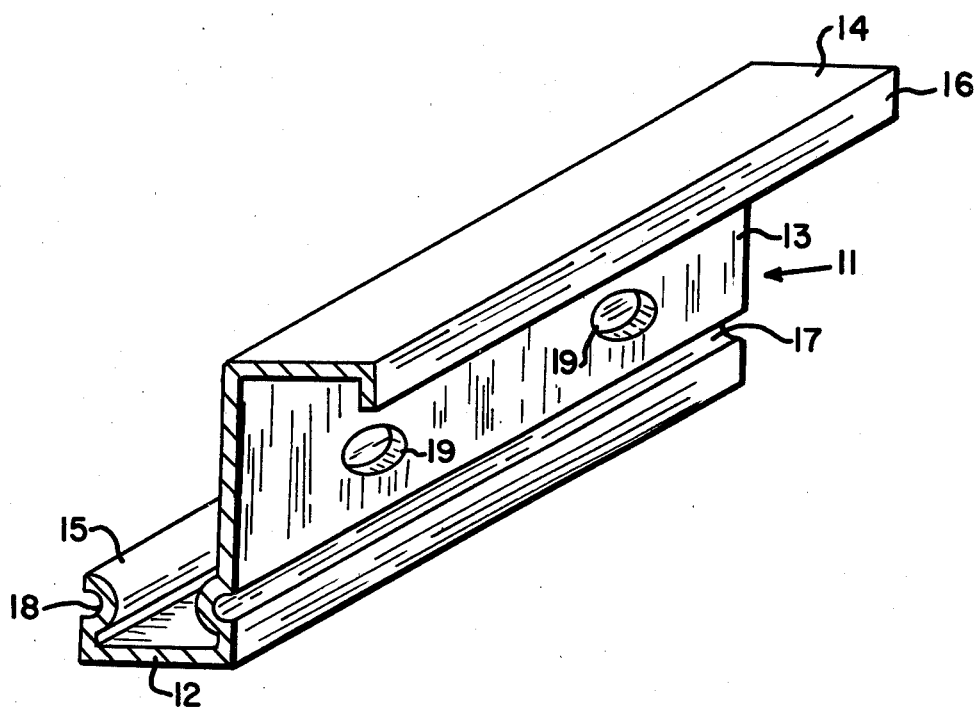
FIGS. 1A through 1D are front views showing a variety of preferred embodiments of sets of characters used on a print band employed in the impact line printer of the invention.

FIGS. 1A through 1D show preferred examples of print bands used in the impact line printer according to the invention. FIG. 1A shows one print band containing 32 characters, FIGS. 1B and 1C show other print bands containing 64 characters, and FIG. 1D shows another print band containing 128 characters. It is noted that the print band of the type containing 48 characters is entirely the same as the conventional 384-character print band containing 8 sets of 48 characters each with no dummy characters, and accordingly an illustration thereof is omitted.

The 32-character print band 1 shown in FIG. 1A contains 30 different type characters 2 used for printing and two dummy type characters 3 which are blanks, or type characters which do not contribute to printing, located next to the type characters 2. The 32-character print band 1 actually contains 12 sets of 32 characters each, thereby including 384 type characters of which 24 are dummy characters. Further, there are also provided type marks 4 in a 1:1 correspondence under the type characters 2 and 3.

In the 64-character print band 1 shown in FIG. 1B, there are 60 different type characters 2 used for printing and 4 blanks or dummy type characters 3 located next to the type characters 2. The 64-character print band 1 actually contains 6 sets of 64 characters thereby including 384 type characters of which 24 are dummy type characters.

In the 64-character print band 1 shown in FIG. 1C each 64-character set contains two different type sets each containing 30 type characters 2 and two dummy type characters 3, as a modification of the 64-character print band 1 shown in FIG. 1B.

The 128-character print band 1 shown in FIG. 1D contains 120 different type characters 2 used for printing and 8 blanks or dummy type characters 3 located next to the type characters 2. The 128-character print band 1 actually contains 3 sets of 128 characters, thereby including 384 characters of which 24 are dummy characters.

Figure 2:
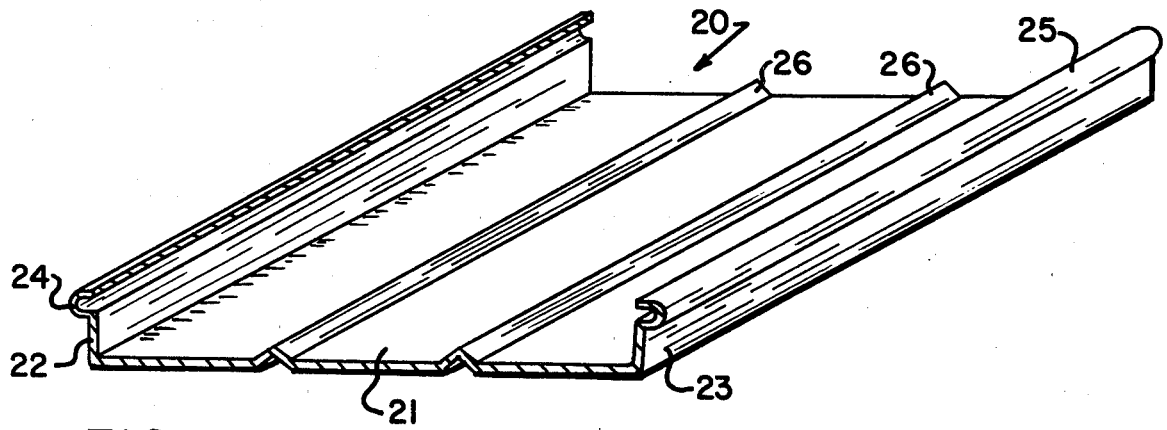
FIG. 2 is a block diagram showing a preferred embodiment of the configuration that writes and stores type array data in the UCSB.

FIG. 2 shows a preferred example of a configuration according to the present invention in which a 240-character type data array transferred from a computer channel (not shown) is converted into a 384-character type data array, and the converted data array is then stored. It should again be noted that the present invention is an impact line printer which uses 384-character print bands but which is compatible with a computer system designed for use with 240-character type line printers. Thus, it should be remembered throughout the following description that, unless otherwise specified, the computer system (not shown) thinks that it is operating with a 240-character line printer and all information transferred to the line printer from the computer system is in 240-character format.

In this configuration, the 240-character type data array corresponding to a 240-character print band is written through an interface bus, a bus buffer 20 and a data bus into a first UCSB 14. The method of writing the type data array in the UCSB 14 is the known "direct memory access" (DMA) method for writing external data directly into the memory of a microcomputer, and a detailed description of the memory writing method is unnecessary for a proper understanding of this invention.

The 240-character type data array thus written into the first UCSB 14 is then converted into a 384-character type data array by a CPU 11 which forms a microcomputer together with I/O ports 12 and 13 and a memory (not shown) such as a ROM, a RAM or the like. The converted 384-character type data is then sequentially written through the I/O port 13 into a second UCSB 15, which will be described in more detail below.

First, the CPU 11 identifies through the I/O port 12 a font kind of the print band, i.e. either one of the 32-character, 48-character, 64-character and 128-character print bands 1 in accordance with character identification data obtained from synchronizing marks, discrimination marks and type character marks (not shown) which are provided in the respective print bands 1. The character identification data is previously obtained by a method of identifying characters as proposed in U.S. patent application Ser. No. 964,111 filed Nov. 27, 1978, assigned to the same assignee as that of the present invention, and based on Japanese Patent Application No. 141874/1977 disclosed as Japanese Patent Laid-open No. 76324/1979.

In the case where 48 characters are employed in the print band, from the fact that $240=48\times5$ and $384=48\times8$, the 240-character type data array written into the UCSB 14 is sequentially written or loaded into address 0 through address 239 of the UCSB 15, and the type data array in address 0 through address 143 of the UCSB 14 are preferably again written or loaded into address 240 through address 383 of the UCSB 15.

Figure 3:
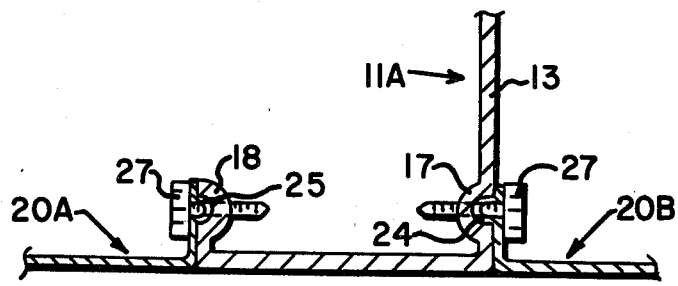
FIG. 3 is an explanatory view showing one example of type array data written and stored in the UCSB for 48-character type array data.

One preferred example of the type data array thus written or loaded from the UCSB 14 into the UCSB 15 is shown in FIG. 3. In FIG. 3, since 240 characters are equal to 5 sets of 48 characters and 384 characters are equal to 8 sets of 48 characters, the 240-character type data array written into the UCSB I (14) at address 0 through address 239 is sequentially loaded into respective addresses 0 through 239 of the UCSB II (15). Further, the 144-character type data array (i.e., the first three 48-character blocks or sets) stored in address 0 through address 143 of the UCSB I (14) are also loaded sequentially into respective addresses 240 through 383 of the UCSB II (15) as shown by the arrows in FIG. 3. Thus, the 240-character type data array is exactly converted into a 384-character type data array.

Figure 5:
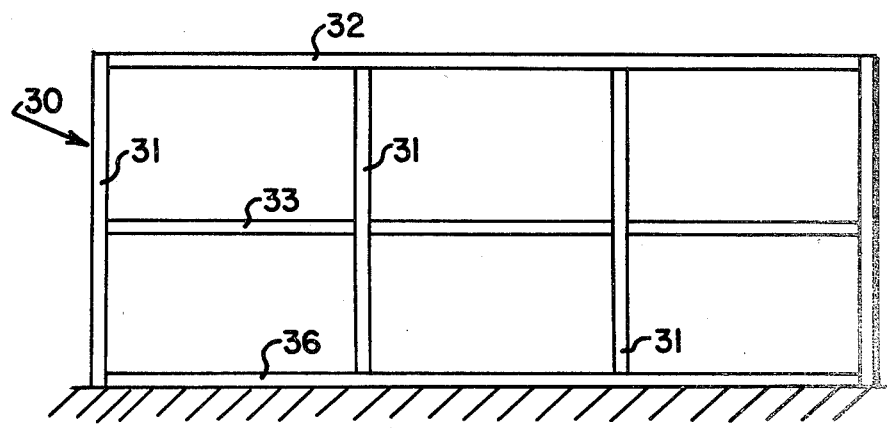
FIG. 5 is a flowchart of a preferred example of 48-character routine to be executed according to the invention.
Figure 4:
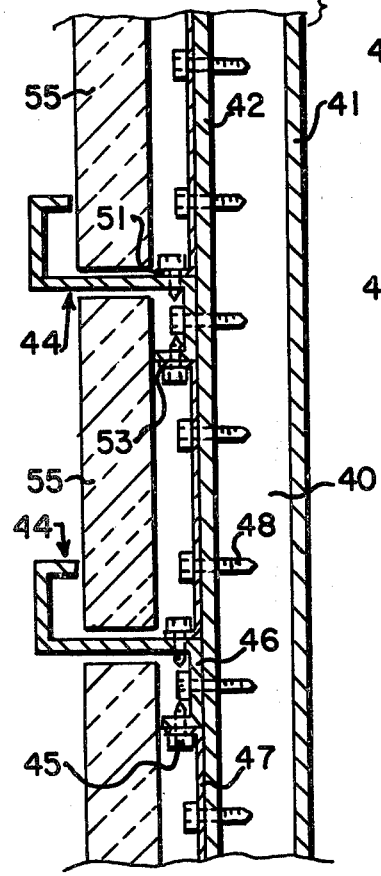
FIG. 4 is a flowchart of one example of a method of converting and writing type array data from 240-character data to 384-character data in the UCSB.

A flowchart of the steps for writing or loading the 240-character type data array from the UCSB I (14) into the UCSB II (15) is shown in FIGS. 4 and 5.

Referring to FIG. 4, a type data array conversion routine is performed by the CPU 11, in which the CPU 11 first reads I/O port 12 which identifies the font kind of the print band being used, which will in turn determine the particular type data array conversion routine to be employed. When the identification data representative of 32-character print band is indicated at I/O port 12, the CPU 11 will execute a 32-character routine. When the identification data representative of 48-character print band is indicated at I/O port 12, the CPU 11 will execute a 48-character routine. When the identification data representative of 64-character print band is indicated at I/O port 12, the CPU 11 will execute a 64-character routine. Similarly, when the identification data representative of 128-character is indicated at I/O port 12, the CPU 11 will execute a 128-character routine, all as indicated in the flowchart in FIG. 4. If one of these identification data is not detected, an alarm will be produced.

FIG. 5 shows a flowchart for a predetermined example of the 48-character routine to be executed according to this invention. When the identification data representative of 48-character print band is indicated at I/O port 12, the CPU 11 will execute the 48-character routine. The sequence of operations which implement the 48-character routine shown in FIG. 5 will now be described. This sequence of operations is illustrated by the following comment statements which are believed to be self explanatory.

Comment, select n=0, N=0.
Comment, select M=0.
Comment, load data from address M of UCSB 14 into accumulator of CPU 11.
Comment, store data from accumulator of CPU 11 in address N of UCSB 15.
Comment, execute N=N+1 and M=M+1.
Comment, execute whether N=48n+48. If not, return to the statement to load data from address M of UCSB 14. If yes,
Comment, execute n=n+1.
Comment, execute whether n≧5 or not. If not, return to the statement to load data from address M of UCSB 14. If yes,
Comment, execute whether n=5. If yes, return to the statement of select M=0. If not, proceed to next comment.
Comment, execute whether n=8. If not, return to the statement to load data from address M of UCSB 14. If yes, proceed to next comment.
Comment, here ends the 48-character routine.

In the case where 64 characters are employed in the print band, from the fact that 240=60×4 and 384=60×6+24, if a 240-character type data array in the UCSB 14 is similarly written or loaded into the UCSB 15 in a manner similar to that described above for the 48-characters a partial block of 24-characters will be produced. Accordingly, the printing speed is extremely decelerated.

Therefore, the type data array in the UCSB 15 must be made to correspond exactly to the type character array of the print band 1 as shown in FIG. 1B. More specifically, the data in address 0 through address 59 of the UCSB 14 is loaded into address 0 through address 59 of the UCSB 15, and then blank (space) codes or meaningless codes are loaded into addresses 60 through 63 of the UCSB 15. Thereafter, data in addresses 60 through 119, addresses 120 through 179, addresses 180 through 239, addresses 0 through 59 and addresses 60 through 119 of the UCSB 14 are sequentially loaded into corresponding addresses 64 through 123, 128 through 187, 192 through 251, 256 through 315 and 320 through 389 of the UCSB 15, respectively. Further, blank (space) codes are loaded into addresses 124 through 127, 188 through 191, 252 through 255, 316 through 319 and 380 through 383 of the UCSB 15. Thus, the type data array stored in UCSB 15 will correspond exactly to a type character array such as the print band 1 in FIG. 1B, thereby eliminating the fractional block and accelerating the printing speed.

Figure 6:
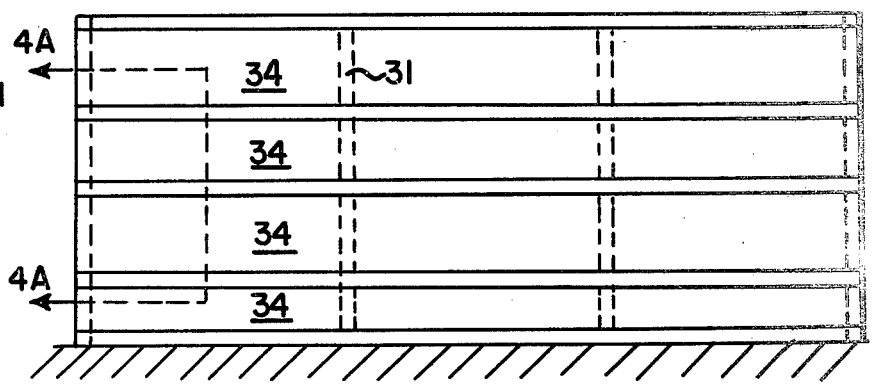
FIG. 6 is an explanatory view showing another example of 64-character type array data written and stored in the UCSB to be converted from 240-character data to 384-character data.

One preferred example of the type data array thus loaded from the UCSB 14 into the UCSB 15 is shown in FIG. 6. In FIG. 6, since 240 characters are equal to 4 sets of 60 characters and 384 characters are equal to 6 sets of 60 characters plus 24 characters, if a 240-character type data array written in the UCSB I (14) is written or loaded into the UCSB II (15) in the same manner as that for the above 48-character type data array, a fractional block of 24 characters will be produced.

Therefore, the type data array in the UCSB II (15) must be made to correspond to the type character array of the print band 1 as shown in FIG. 1B. Accordingly, the data stored in addresses 0 through 59 of the UCSB I (14) are initially loaded into addresses 0 through 59 of the UCSB II (15). Next, blank (space) codes or meaningless code are loaded into addresses 60 through 63 of the UCSB II (15) by the operation of CPU 11. Similarly, data in addresses 60 through 119 of the UCSB I (14) are then loaded into addresses 64 through 123 of the UCSB II (15), and further blank (space) codes or meaningless codes are loaded into addresses 124 through 127 of the UCSB II (15). In this manner, 60-character type data from the UCSB I (14) and 4-character blank or meaningless codes from CPU 11 are loaded into 64 corresponding addresses in the UCSB II (15). Thus, the type data array in UCSB 15 will correspond exactly to the characters on a 64-character print band such as shown in FIG. 1B.

Figure 7:
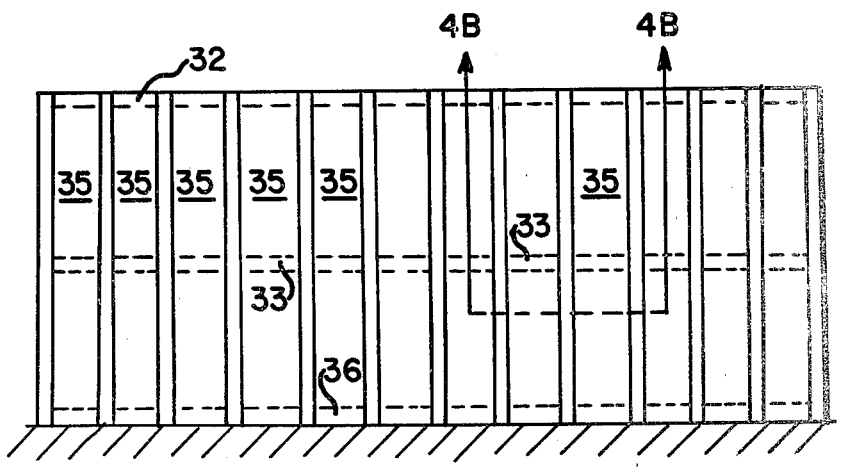
FIG. 7 is a flowchart of preferred example of 64-character routine to be executed according to the invention to be converted from 240-character data to 384-character data.

A flowchart of the steps of writing or loading such a 240-character type data array from the UCSB I (14) into the UCSB II (15) is shown in FIG. 7. The 64-character type data array conversion routine is performed by the CPU 11 after first reading I/O port 12, in the same manner as in the 48-character type data array conversion routine as indicated in FIG. 4, to determine the particular subroutine to be performed. The 64-character routine is then executed according to the invention as shown in FIG. 7, as will be described in more detail. The sequence of operations which implement the 64-character routine shown in FIG. 7 is represented by the following comment statements which are believed to be self-explanatory.

Comment, select n=0 and N=0.
Comment, select M=0.
Comment, load data from address M of UCSB 14 into accumulator of CPU 11.
Comment, store data from accumulator of CPU 11 into address N of UCSB 15.
Comment, execute N=N+1 and M=M+1.
Comment, execute whether N=64n+60. If not, return to the statement to load data from address M of UCSB 14. If yes,
Comment, store space code in address N of UCSB 15.
Comment, execute N=N+1.
Comment, execute whether N=64N+64. If not, return to the statement to store space code in address N of UCSB 15. If yes, proceed to next comment.
Comment, execute n=n+1.
Comment, execute whether n≧4 or not. If not, return to the statement to load data from address M of UCSB 14 into accumulator of CPU 11. If yes, proceed to next statement.
Comment, execute whether n=4. If yes, return to the statement to execute M=0. If not, proceed to next statement.
Comment, execute whether n=6, If not, return to the statement to load data from address M of UCSB 14 into accumulator of CPU 11. If yes, proceed to next statement.
Comment, here ends the 64-character routine.

Figure 8:
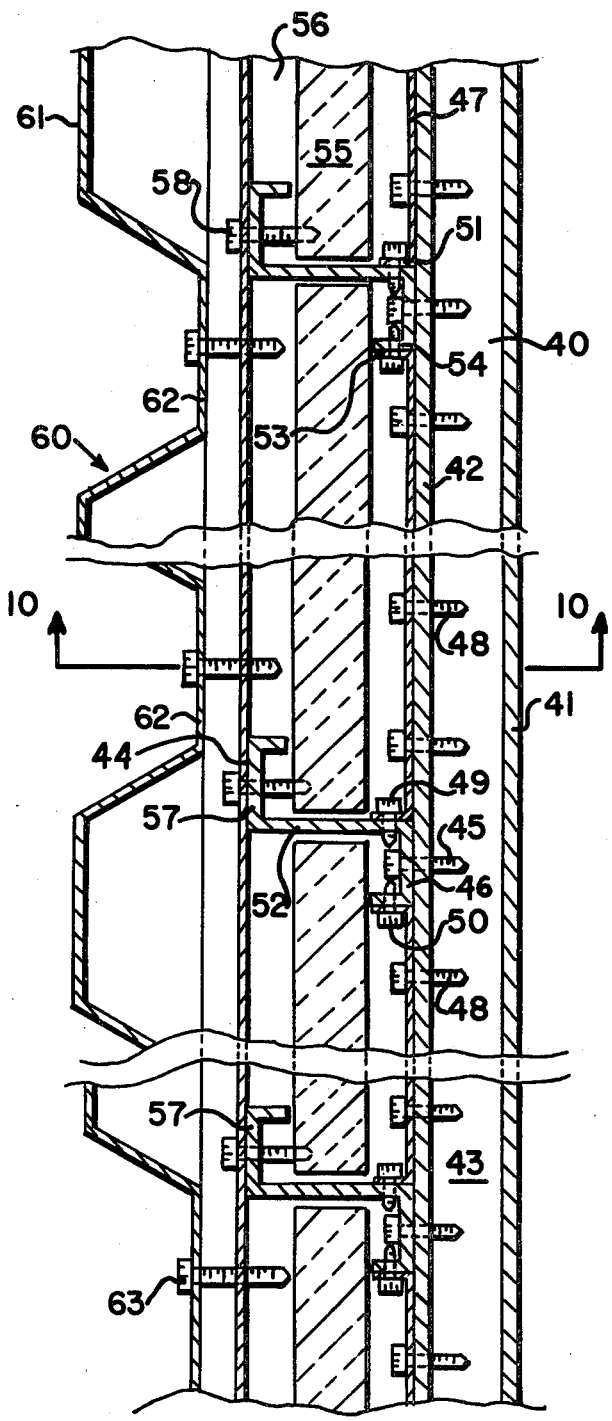
FIG. 8 is a flowchart of a further preferred example of type array data written and stored in the UCSB to be converted from 240-character data to 384-character data for 32-character routine.
Figure 9:
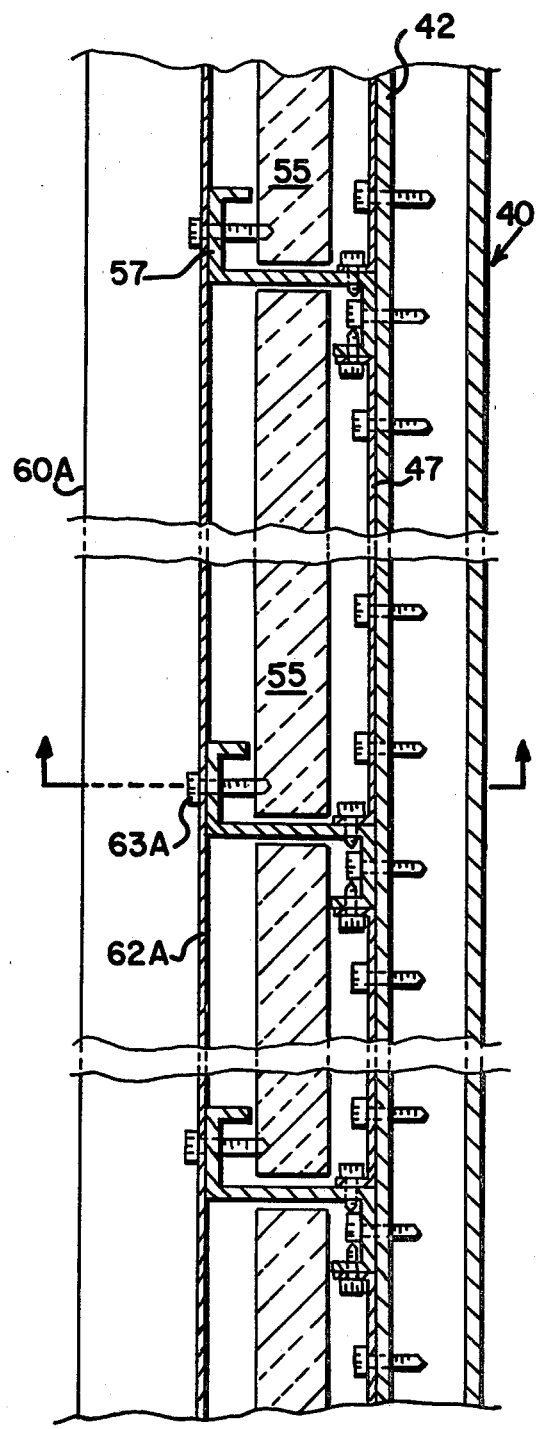
FIG. 9 is a view similar to FIG. 8 but showing still another preferred example of type array data written and stored in the UCSB to be converted from 240- character data to 384-character data for 128-character routine.
Figure 10:
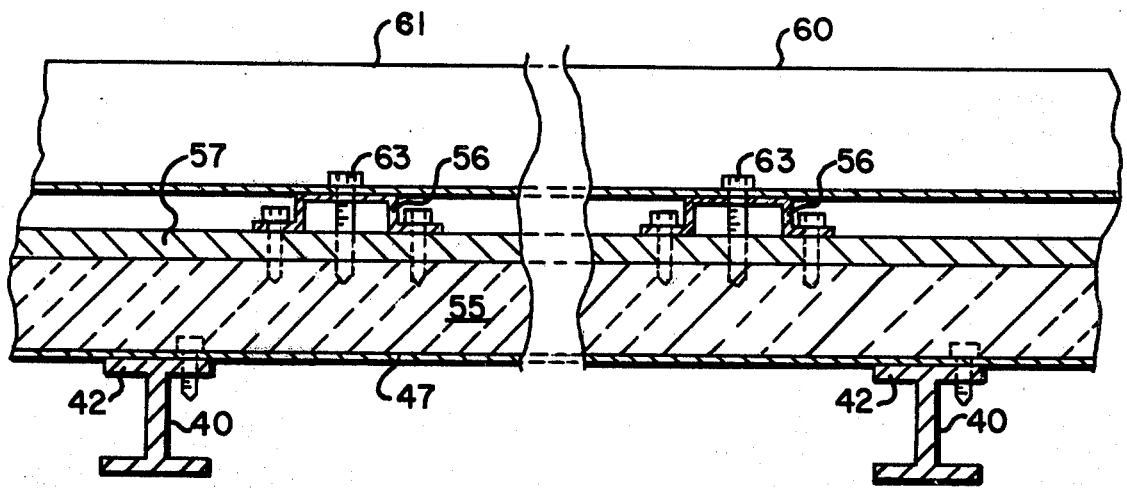
Figure 11:
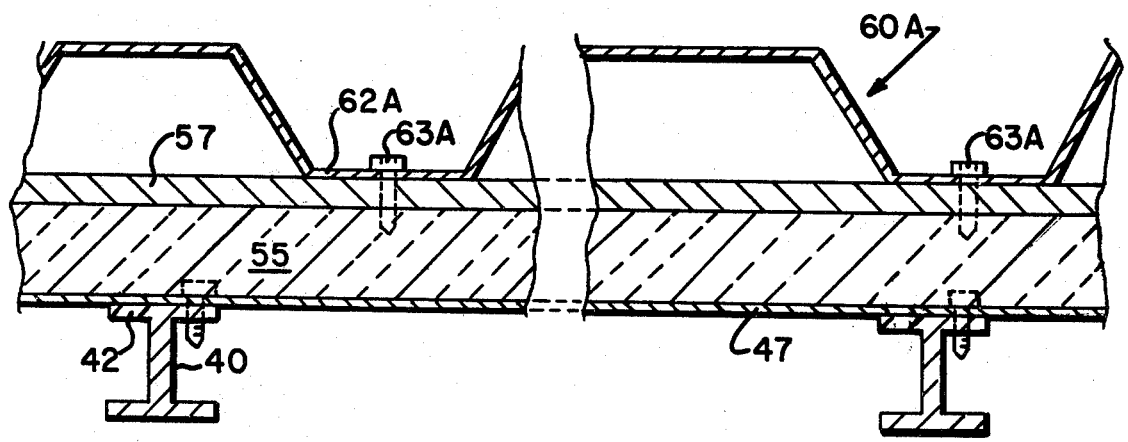
Figure 12:
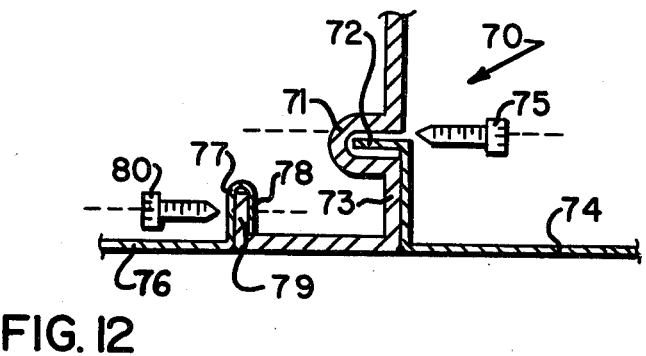
Figure 13:
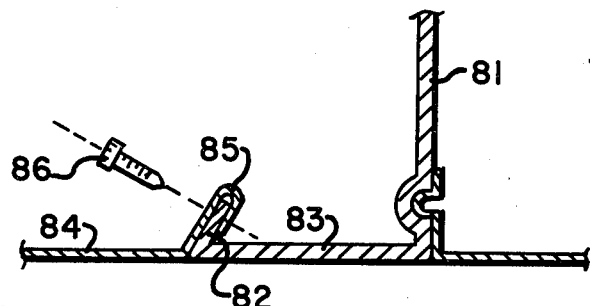
Figure 16:
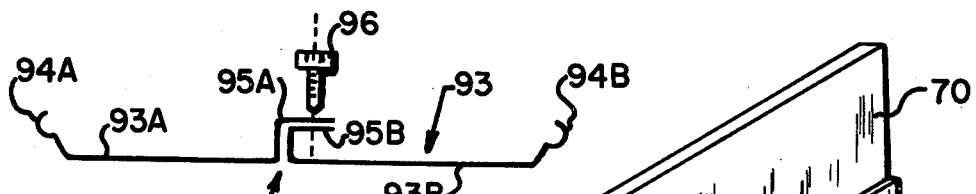
Figure 14:
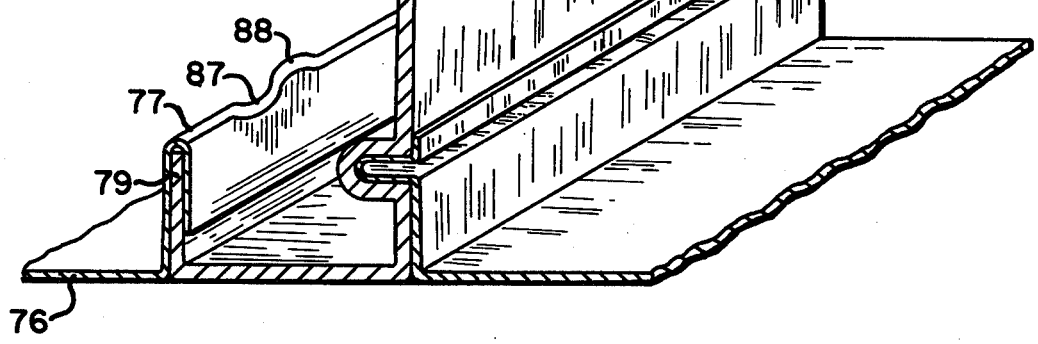
Figure 15:

It is noted that since methods of converting to a 32-character type data array and to a 128-character type data array can be readily understood from the above described method of converting to a 64-character type data array by those skilled in the art, the descriptions thereof will be omitted, and only their flowcharts will be shown in FIGS. 8 and 9, respectively. It is further noted that since method of writing and converting to a 64-character type data array such as on the print band 1 shown in FIG. 1C is entirely the same as that shown in FIG. 8, the description and flowchart will be omitted.

Turning again to FIG. 2, the remainder of the printer operation is substantially the same as in a conventional printer. The computer (not shown) which is coupled to the line printer of FIG. 2 and which has transferred to the UCSB 14 the 240-character type data array, also provides through a bus buffer 21 to a Print Line Buffer (PLB) 16 data for a line to be printed. For example, the PLB 16 may receive 136 columns of data, with the character to be printed in each column represented by an eight bit word. An address counter 19 then counts up or down to provide a sequence of addresses to the PLB 16 and thereby provide the print data serially to a comparator 17. In other words, for one counter value a particular 8-bit column word is supplied to the comparator 17, for the next counter value the next 8-bit column word is supplied, and so forth. During this time, the bus buffer 21 is closed to prevent backflow of data onto the bus.

The UCSB 15 is addressed by a counter 18 so that its data is also serially fed to the comparator 17. The counter 18 is clocked by a source of clock pulse (not shown) synchronized to or derived from the print band movement so that the output of counter 18 corresponds to the print band position and the output of UCSB 15 thus indicates the print character presently opposite any particular hammer. When the data from PLB 16 and UCSB 15 coincide, a print command signal is provided from comparator 17.

The above description of the actual printing operation is given only briefly to place the invention in its proper perspective. This aspect of printer operation is well known and does not constitute a part of the present invention, and it will be appreciated that the actual operation is somewhat more complicated than described above, e.g. the comparator output print command signal must be appropriately distributed to the 136 print hammers (not shown) through print hammer driving circuits (not shown).

As can be seen from the foregoing description, in the impact line printer according to this invention, the 240-character type data array transferred from the computer to the line printer is converted into a type data array having the same number of characters as on the type carrier and the type data array thus converted is written and loaded into the UCSB 15. Thus, the line printer of this invention can be used in a computer system designed for 240-character line printer without modifying the software of the computer.

It will also be appreciated that since a predetermined number of blanks or dummy type characters which do not contribute to printing are provided in each block or set of characters as necessary, thereby eliminating the fractional block, the type data array store in the UCSB corresponds exactly to the type character array on the print band. Therefore, the impact line printer of this invention is capable of maintaining a high printing speed.

Although the invention has been described with reference to a line printer utilizing a print band, it should be noted that the invention is not limited thereto but is also applicable to printers wherein the type carrier is not in the form of a band but is a print drum, print train, or the like.

What is claimed is:

1. A line printer of the type capable of using a plurality of different type carriers each having a different array of N characters, and also having a memory for storing data for use in a printing operation, said data corresponding to the particular type carrier being used, for use in a printing system wherein a computer system transfers to said line printer a first data array corresponding to one of a plurality of different type carriers having an array of M characters, where M and N are unequal positive integers, said line printer comprising:
   first memory means for receiving and storing said first data array from said computer system corresponding to an M-character type carrier; and
   means for converting said first data array to a second data array corresponding to an N-character type carrier useable by said line printer and for storing said second data array for use in a printing operation.

2. A line printer as claimed in claim 1, wherein N is greater than M.

3. A line printer as claimed in claim 2, wherein said second data array includes I identical sets of characters, each set including K characters, and $I \times K = N$.

4. A line printer as claimed in claim 3, wherein said particular type carrier being used includes a plurality of identical sets of type characters with each set including a plurality of dummy characters which are not to be printed.

5. A line printer as claimed in claim 3, wherein said first data array comprises J identical sets of L characters each, where I is greater than J, and K equals L.

6. A line printer as claimed in claim 3, wherein said first data array comprises J identical sets of L characters each, where I is greater than J, and K is greater than L.

7. A line printer as claimed in claim 6, wherein each of said I identical character sets includes all of the L characters in each set of said first array and also includes K−L dummy characters which are not to be printed.

8. A line printer as claimed in claim 5, wherein said first memory means comprises a first universal character set buffer and wherein said means for converting and for storing comprises:
   a second universal character set buffer for storing data corresponding to the particular type carrier being used; and
   processing means for transferring said M character first data array from said first universal character set buffer to M memory locations in said second universal character set buffer and for transferring I−J sets of said first data array to N−M further memory locations in said second universal character set buffer.

9. A line printer as claimed in claim 7, wherein said first memory means comprises a first universal character set buffer and wherein said means for converting and for storing comprises:
   a second universal character set buffer for storing data corresponding to the particular type carrier being used; and processing means for transferring said first data array from said first universal character set buffer to said second universal character set buffer while adding said dummy characters thereto, each of said I character sets in said second data array formed by transferring one of said J character sets to L consecutive memory locations in said second universal character set buffer and then writing K−L dummy characters into the next K−L consecutive memory locations of said second universal character set buffer.

10. The line printer as claimed in either of claims 8 or 9, wherein said processing means includes means for determining the number of characters in each character set on the particular type carrier being used, said processing means inserting each of said I character sets a number of dummy characters in accordance with said determined number of characters.

11. In a line printer of the type capable of using a plurality of different type carriers each having a different array of N characters arranged in I identical sets of K characters each, and also having a memory for storing data for use in a printing operation, said data corresponding to the particular type carrier being used, for use in a printing system wherein a computer system transfers to said line printer a first data array corresponding to one of a plurality of different type carriers having an array of M characters arranged in J identical sets of L characters each, where M and N are unequal positive integers, said line printer comprising:

first memory means for receiving and storing said first data array from said computer system corresponding to an M character type carrier; and converting means for converting said first data array to a second data array corresponding to an N character type carrier usable by said line printer and for storing said second data array for use in a printing operation, said converting means storing said M-character first data array in a first plurality of M memory locations, and storing I−J sets of said first data array in a second plurality of memory locations.

* * * * *